(12) United States Patent
Shigihara et al.

(10) Patent No.: US 7,453,415 B2
(45) Date of Patent: Nov. 18, 2008

(54) ANTENNA APPARATUS FOR TRANSPONDER

(75) Inventors: Makoto Shigihara, Fukushima-ken (JP); Yasuhiro Konno, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 2 days.

(21) Appl. No.: 11/809,051

(22) Filed: May 30, 2007

(65) Prior Publication Data

US 2008/0001842 A1    Jan. 3, 2008

(30) Foreign Application Priority Data

Jun. 30, 2006  (JP) .............................. 2006-181930

(51) Int. Cl.
*H01Q 1/42* (2006.01)
(52) U.S. Cl. ................ 343/872; 343/717; 343/755; 343/793; 343/795; 343/866
(58) Field of Classification Search ................ 343/717, 343/755, 793, 795, 872, 866, 873
See application file for complete search history.

(56) References Cited

U.S. PATENT DOCUMENTS 6,157,302 A * 12/2000 Kolton et al. ............ 340/572.7
7,050,017 B2 * 5/2006 King et al. ................ 343/873
7,059,178 B2 * 6/2006 Fischer et al. .............. 73/147
7,196,618 B2 * 3/2007 Chen ......................... 340/447
2003/0066343 A1   4/2003 Fischer et al.

FOREIGN PATENT DOCUMENTS

JP        10-44726        2/1998
JP      2006-306184      11/2006

* cited by examiner

*Primary Examiner*—Douglas W. Owens
*Assistant Examiner*—Chuc Tran
(74) *Attorney, Agent, or Firm*—Beyer Law Group LLP

(57) ABSTRACT

An antenna apparatus is mounted at a wheel rim as a transponder of a system for monitoring a tire pressure or the like, and attached at an end portion of an air valve. The apparatus includes a circuit board having an electronic circuit portion and a grounding conductor layer, a sheet-metal inverse-F type antenna element, a sheet-metal shield case conducting to the grounding conductor layer to cover the electronic circuit portion, and a resin case for accommodating these components. One side surface extending in a longitudinal direction of a space defined between the circuit board and the radiating conductor of the antenna element faces one of sidewalls of a tire, and the other side surface thereof faces a wall surface of the wheel rim with a distance interposed therebetween, the distance being about one-fourth of a wavelength of a radio wave to be used.

5 Claims, 3 Drawing Sheets

ANTENNA APPARATUS FOR TRANSPONDER

CLAIM OF PRIORITY

This application claims benefit of the Japanese Patent Application No. 2006-181930 filed on Jun. 30, 2006, which is hereby incorporated by reference.

BACKGROUND OF THE INVENTION

1. Field of the Invention

The present invention relates to an antenna apparatus mounted at a wheel rim of a tire of a vehicle, to be used as a transponder of a system for monitoring a tire pressure or the like.

2. Description of the Related Art

In recent years, systems for monitoring tire pressures have been popular. In such a system, an antenna apparatus with a pressure sensor like a quartz vibrator embedded is mounted at a rim of a wheel (a wheel rim) of a tire, so that a driver can recognize a tire pressure even while driving the vehicle. In the tire-pressure monitoring system (TPMS), the antenna apparatus used as a transponder is generally attached to the wheel rim at a side facing the space inside the tire. Such an antenna apparatus has an antenna element capable of transmitting/receiving signals to/from an external antenna provided at a vehicle body. When the antenna element receives an interrogation signal from an interrogator provided in a vehicle cabin and connected to the external antenna, tire-pressure information detected by the pressure sensor is transmitted from the antenna element to the external antenna. The communication between the antenna element and the external antenna provided at the vehicle body uses a vertically polarized wave.

The antenna apparatus used as a transponder includes the antenna element and a circuit board. The circuit board has an electronic circuit portion including a sensor circuit and a transmitting/receiving circuit. Since the antenna apparatus is rotated with the tire, a large centrifugal force or a shock may be applied to the antenna apparatus during driving of the vehicle. Thus, it is difficult to hold a required attachment strength merely by bonding the antenna apparatus on the wheel rim. To solve this, various suggestions have been made to provide attachment configurations of antenna apparatuses by using air valves provided at wheel rims (for example, see Japanese Unexamined Patent Application Publication No. 10-44726, pages 2 and 3, and FIG. 1).

However, in these known antenna apparatuses in which the antenna apparatuses are mounted at the wheel rims by using the air valves as described above, when a configuration in which a part of an air valve (e.g., a grommet) is modified to be used for the antenna apparatus is employed, the manufacturing cost may not be reduced, and the antenna apparatus may not be attached to various types of wheels later. Also, in these known antenna apparatuses mounted at the wheel rims, when a configuration in which the entire apparatus is not sufficiently reduced in height is employed, a tool or the like may come into contact with the antenna apparatus during detachment of a tire, whereby the apparatus may be damaged.

In a case where the antenna element of the antenna apparatus mounted at the wheel rim is a patch antenna, the gain thereof is necessary to be decreased to achieve reduction in height of the apparatus. When a radio wave (a linearly polarized wave) is radiated from the patch antenna of the antenna apparatus mounted at the wheel rim toward a tread of the tire, the wave may be reflected by a metal band embedded in the tread. To avoid the reflection, the patch antenna may be preferably arranged in a posture such that radial beam with a high field intensity is radiated toward an area within a sidewall of the tire. In such a case, the patch antenna is necessary to be inclined largely relative to a radial direction of a wheel to achieve the reduction in height of the apparatus, so that the radial beam with the high field intensity is radiated toward the tread of the tire. As a result, a major portion of the wave radiated from the patch antenna is reflected by the tread and the wheel rim repeatedly, and then passes through the sidewall. Due to this, an amount of vertically polarized wave component received by the external antenna provided at the vehicle body may be decreased, and the gain thereof is decreased. This may degrade communication performance.

SUMMARY OF THE INVENTION

The present invention provides an antenna apparatus that easily provides reduction in height of the apparatus and reduction in manufacturing cost thereof, allows the apparatus to be mounted at a wheel rim later, and efficiently radiates a vertically polarized wave toward a sidewall of a tire.

Accordingly, the present invention provides an antenna apparatus including a circuit board having an electronic circuit portion provided on one surface thereof and a grounding conductor layer provided on the other surface thereof; an antenna element mounted at the other surface of the circuit board; a shield case formed by sheet-metal processing and conducting to the grounding conductor layer to cover the electronic circuit portion at the one surface of the circuit board, and a resin case for accommodating the circuit board, the antenna element, and the shield case, the resin case being attached to an end portion of an air valve provided at a wheel rim of a tire of a vehicle. In this apparatus, the antenna element includes a radiating conductor disposed substantially parallel to the grounding conductor layer, a feeding conductor extending from the radiating conductor toward the circuit board and connected to the electronic circuit portion, and a grounding conductor extending from the radiating conductor toward the circuit board and connected to the grounding conductor layer, and a posture of the antenna element in the resin case is determined such that one side surface extending in a longitudinal direction of a space defined between the circuit board and the radiating conductor faces one of sidewalls of the tire.

Since the antenna element mounted on the circuit board employs a structure of an inverse-F antenna, an electric field generated between the radiating conductor and the grounding conductor layer of the circuit board is radiated as a radio wave (a linearly polarized wave) having a vertically polarized wave component and a horizontally polarized wave component. Since the antenna apparatus is arranged in the resin case attached at the end portion of the air valve such that the one side surface extending in the longitudinal direction of the space defined between the circuit board and the radiating conductor faces the one of the sidewalls of the tire, the vertically polarized wave with the high field intensity is radiated from the antenna element toward the sidewall. Accordingly, the gain of the vertically polarized wave component may be increased, and the entire antenna apparatus may be reduced in height. In the antenna apparatus, since the electronic circuit portion of the circuit board is covered with the sheet-metal shield case conducting to the grounding conductor layer, the electronic circuit portion is electromagnetically shielded, whereby an erroneous operation may be prevented. In addition, the ground of the antenna element may be enhanced by the shield case, resulting in the amount of radiation of the horizontally polarized wave being decreased while the amount of radiation of the vertically polarized wave being increased. Accordingly, the antenna element of the antenna apparatus may radiate the vertically polarized wave efficiently toward the sidewall of the tire, thereby markedly improving the communication performance. Also, the antenna apparatus may be attached to various types of wheels later without the necessity of modifying the air valve to be attached. Accordingly, the manufacturing cost of the antenna apparatus may be relatively low, and usability of the antenna apparatus may be improved.

With the above configuration, the other side surface extending in the longitudinal direction of the space defined between the circuit board and the radiating conductor may preferably face a wall surface of the wheel rim with a distance interposed therebetween, the distance being about one-fourth of a wavelength of a radio wave to be used. Accordingly, the vertically polarized wave radiated toward the sidewall after it is reflected by the wall surface may be superposed with the vertically polarized wave directly radiated from the antenna element toward the sidewall, thereby further increasing the gain of the vertically polarized wave component.

With the above configuration, the antenna element may be preferably formed by sheet-metal processing. Accordingly, the antenna element with a low manufacturing cost and a high mechanical strength may be provided. In addition, in a case where the feeding conductor and the grounding conductor of the sheet-metal antenna element are formed as bent pieces extending to the circuit board from an end portion in a longitudinal direction of the radiating conductor made of a metal plate, the antenna element may serve as a typical inverse-F antenna. Alternatively, in a case where the feeding conductor and the grounding conductor are formed as bent pieces extending toward the circuit board from a center portion in a longitudinal direction of the radiating conductor made of a metal plate, an antenna element being an inverse-F antenna but having a substantially T-shaped appearance may be provided, and the radiation of the horizontally polarized wave is decreased. Accordingly, the radiation efficiency of the vertically polarized wave may be further enhanced, and the posture of the antenna element may be a markedly stable.

With the above configuration, the resin case may preferably have an attachment protrusion to be inserted and pressed to an air hole of the air valve and fixed thereto. Accordingly, the resin case may be easily and reliably attached to the end portion of the air valve.

Since the antenna apparatus of the present invention has the antenna element with the structure of the inverse-F antenna, and is arranged in the resin case attached at the end portion of the air valve such that the one side surface extending in the longitudinal direction of the space defined between the circuit board and the radiating conductor faces the one of the sidewalls of the tire, the vertically polarized wave with the high field intensity is radiated from the antenna element toward the sidewall. Accordingly, the gain of the vertically polarized wave component may be increased, and the entire antenna apparatus may be reduced in height. In the antenna apparatus, since the electronic circuit portion of the circuit board is covered with the sheet-metal shield case conducting to the grounding conductor layer, the electronic circuit portion is electromagnetically shielded, whereby an erroneous operation may be prevented. In addition, the ground of the antenna element may be enhanced by the shield case, resulting in the amount of radiation of the horizontally polarized wave being decreased while the amount of radiation of the vertically polarized wave being increased. Accordingly, the antenna element of the antenna apparatus may radiate the vertically polarized wave efficiently toward the sidewall of the tire, thereby markedly improving the communication performance. Also, the antenna apparatus may be attached to various types of wheels later without the necessity of modifying the air valve to be attached. Accordingly, manufacturing cost of the antenna apparatus may become relatively low, and usability of the antenna apparatus may be improved. Thus noticeable practical effects may be obtained.

DESCRIPTION OF THE PREFERRED EMBODIMENTS

Figure 1:
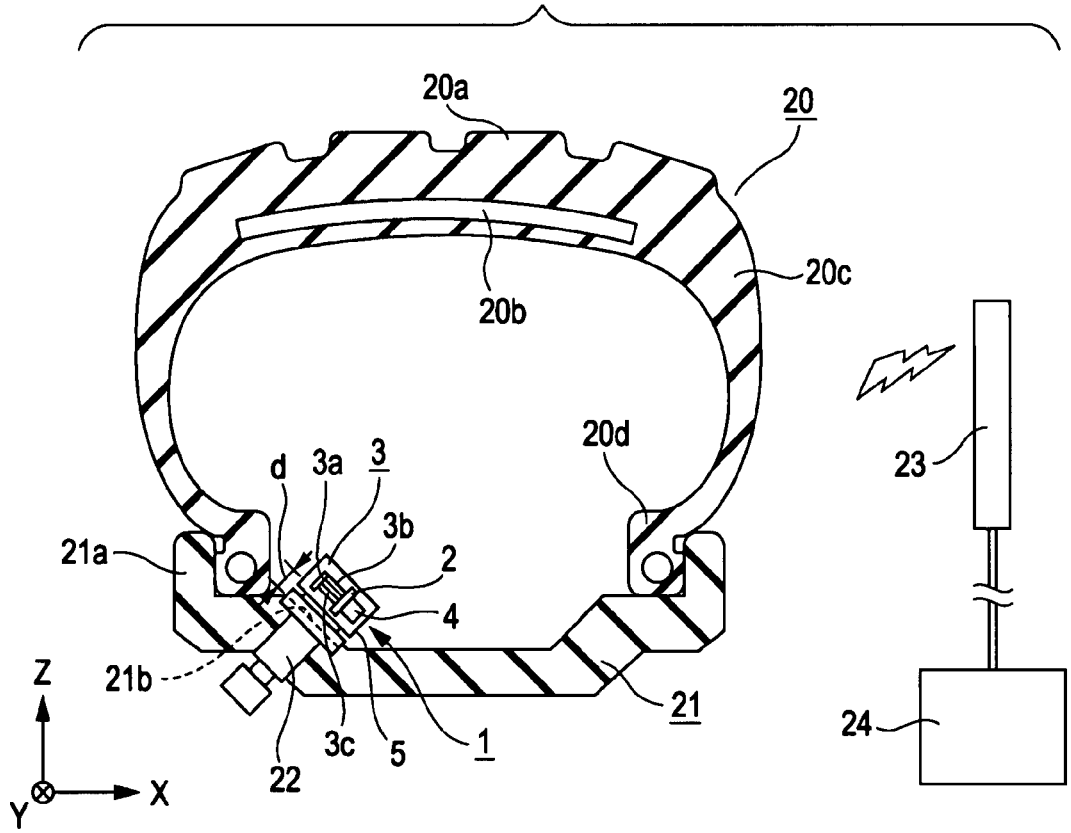
FIG. 1 is a cross-sectional view schematically showing a state where an antenna apparatus according to a first embodiment of the present invention is mounted at a wheel rim.
Figure 4:
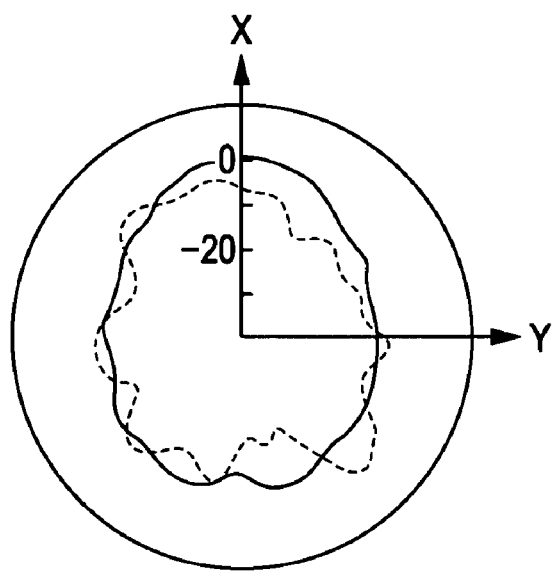
FIG. 4 is a characteristic diagram showing a radiation pattern in an azimuth plane of the antenna apparatus.
Figure 5:
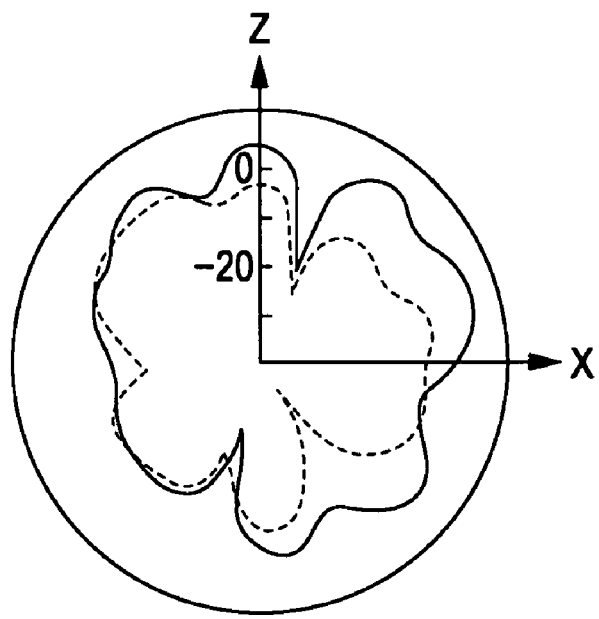
FIG. 5 is a characteristic diagram showing a radiation pattern in an elevation plane of the antenna apparatus.

An embodiment of the present invention is described with reference to FIGS. 1 to 5. FIG. 1 is a cross-sectional view schematically showing a state where an antenna apparatus according to a first embodiment of the present invention is mounted at a wheel rim, FIG. 2 is a perspective view specifically showing a primary portion of the antenna apparatus in an attached state, FIG. 3 is an exploded perspective view corresponding to FIG. 2, FIG. 4 is a characteristic diagram showing a radiation pattern in an azimuth plane of the antenna apparatus, and FIG. 5 is a characteristic diagram showing a radiation pattern in an elevation plane of the antenna apparatus.

Figure 2:
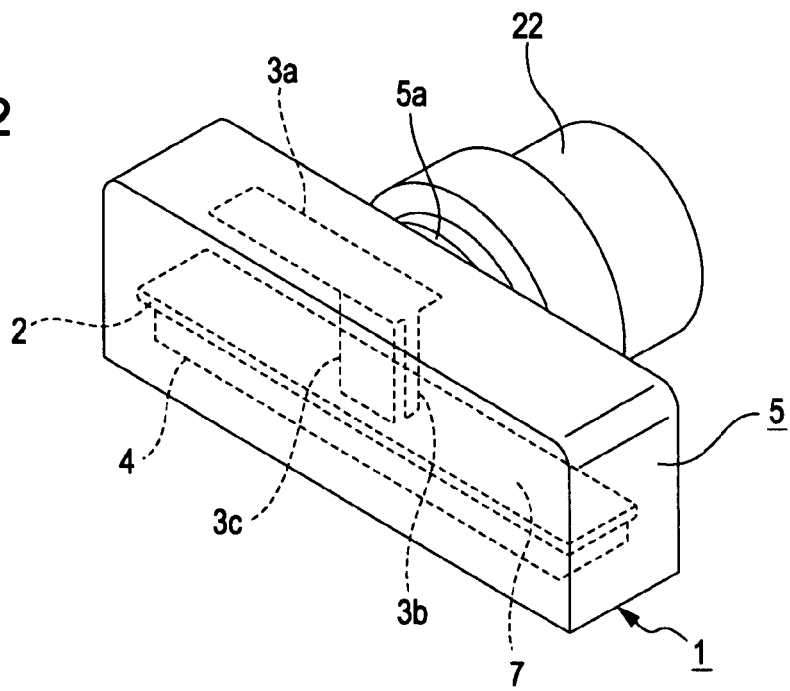
FIG. 2 is a perspective view specifically showing a primary portion of the antenna apparatus in an attached state.
Figure 3:
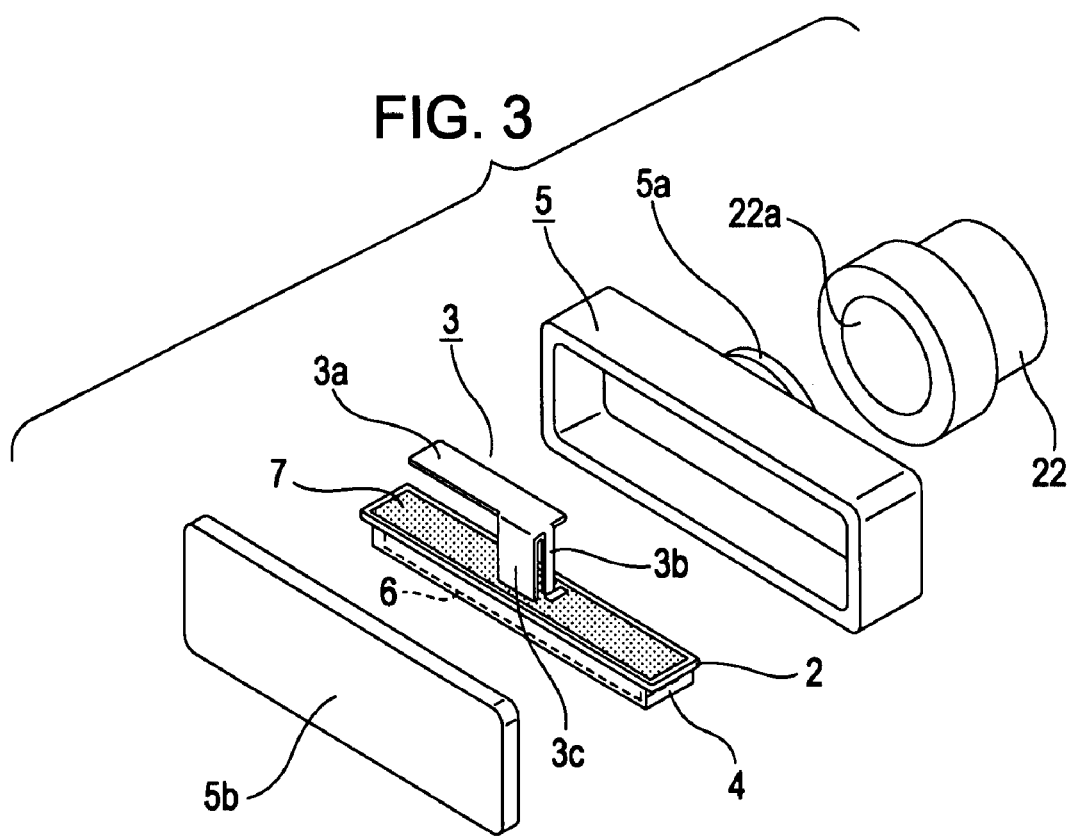
FIG. 3 is an exploded perspective view corresponding to FIG. 2.

An antenna apparatus 1 shown in FIGS. 1 to 3 is mounted at a wheel rim 21 at a position facing the space inside a tire 20, to be used as a transponder of a tire-pressure monitoring system (TPMS). The antenna apparatus 1 is attached by using an air valve 22 provided at the wheel rim 21. The antenna apparatus 1 is mainly composed of a circuit board 2 having an electronic circuit portion 6 disposed at a lower surface of the circuit board 2, an antenna element 3 formed by sheet-metal processing and mounted on the circuit board 2, a shield case 4 formed by sheet-metal processing, and disposed at the lower surface of the circuit board 2 so as to cover the electronic circuit portion 6, and a resin case 5 that accommodates the circuit board 2, the antenna element 3, and the shield case 4. The resin case 5 has an attachment protrusion 5a. The antenna apparatus 1 is integrated with the wheel rim 21 in a posture shown in FIG. 1 by inserting and pressing the attachment protrusion 5a of the resin case 5 to an air hole 22a formed at an end portion of the air valve 22, and fixing the attachment protrusion 5a thereto. An external antenna 23 is provided at a vehicle body at a portion near the tire 20. The external antenna 23 transmits/receives signals to/from the antenna apparatus 1, and is connected to a control unit 24 provided in a vehicle cabin and having an interrogator.

The structure of the tire 20 has sidewalls 20c provided on both sides of a tread 20a in a width direction. The tread 20a has a metal band 20b embedded therein. Beads 20d are defined at inner peripheries of the sidewalls 20c. The tire 20 is attached to the wheel rim 21 by fitting the beads 20d into flanges 21a of the wheel rim 21.

The detailed configuration of the antenna apparatus 1 is described. A grounding conductor layer 7 is provided on an upper surface of the circuit board 2. The electronic circuit portion 6 disposed at the lower surface of the circuit board 2 has a sensor circuit and a transmitting/receiving circuit. The antenna element 3 is composed of a radiating conductor 3a, a feeding conductor 3b and a grounding conductor 3c. The radiating conductor 3a is made of a metal plate disposed substantially parallel to the grounding conductor layer 7. The feeding conductor 3b is formed as a bent piece extending from the radiating conductor 3a toward the circuit board 2 and connected to the transmitting/receiving circuit (the electronic circuit portion 6). The grounding conductor 3c is formed as a bent piece extending from the radiating conductor 3a toward the circuit board 2 and connected to the grounding conductor layer 7. That is, the antenna element 3 is an inverse-F antenna made of a metal plate that is formed by bending. The posture of the antenna element 3 in the resin case 5 is determined such that one side surface extending in a longitudinal direction of a space defined between the circuit board 2 and the radiating conductor 3a faces one of the sidewalls 20c of the tire 20. Accordingly, the antenna element 3 can transmit/receive signals to/from the external antenna 23 provided at the vehicle body through the sidewall 20c. In addition, the other side surface extending in the longitudinal direction of the space defined between the circuit board 2 and the radiating conductor 3a faces a wall surface 21b of the wheel rim 21 with a distance d interposed therebetween, the distance d being about one-fourth of the wavelength of a radio wave to be used. Accordingly, a radio wave radiated toward the sidewall 20c after it is reflected by the wall surface 21b may be easily superposed with a radio wave directly radiated from the antenna element 3 toward the sidewall 20c. For example, when the radio wave with a frequency of 2.5 GHz is used, the distance d may be about 3 cm. The resin case 5 is a casing having a cover plate 5b. The inner structure of the resin case 5 is designed so as to position the circuit board 2 and the shield case 4, and to retain these components therein. The attachment protrusion 5a protrudes from a surface of the resin case 5 opposite to the surface provided with the cover plate 5b.

The antenna apparatus 1 utilizes an induced electromotive force as a power source, the force being generated due to the radio wave transmitted from the external antenna 23 provided at the vehicle body. Thus, the antenna apparatus 1 does not need an additional power source or a battery.

Next, an operation of the antenna apparatus 1 is described. The antenna apparatus 1 supplies a predetermined feed signal from a transmitting/receiving circuit of the electronic circuit portion 6 to the feeding conductor 3b of the antenna element 3 to cause the radiating conductor 3a to be excited. During the excitation, an electric field generated between the radiating conductor 3a and the grounding conductor layer 7 is radiated as a radio wave (a linearly polarized wave) having a vertically polarized wave component and a horizontally polarized wave component. As schematically shown in FIG. 1, the radio wave radiated from the antenna element 3 passes through the one of the sidewalls 20c of the tire 20, and is transmitted to the external antenna 23 provided at the vehicle body. In particular, an interrogation signal provided by the interrogator embedded in the control unit 24 disposed in the vehicle cabin is transmitted from the external antenna 23 to the antenna apparatus 1. When the antenna element 3 receives the signal, tire-pressure information detected by a pressure sensor of the sensor circuit (the electronic circuit portion 6) is transmitted from the antenna element 3 to the external antenna 23, and the tire-pressure information is displayed on a display screen of the control unit 24. Since the communication between the antenna element 3 and the external antenna 23 uses the linearly polarized wave, in order to enhance communication performance, the linearly polarized wave is necessary to be efficiently radiated from the antenna element 3 toward the sidewall 20c arranged near the external antenna 23. In the case of this embodiment, the one side surface extending in the longitudinal direction of the space of the inverse-F type antenna element 3, the space being defined between the circuit board 2 and the radiating conductor 3a, faces the sidewall 20c arranged near the external antenna 23, whereby the antenna element 3 may efficiently radiate the vertically polarized wave toward the sidewall 20c.

To be more specific, assuming that a rightward direction, a depth direction, and an upward direction are an X direction, a Y direction, and a Z direction, respectively, a radiation pattern of the vertically polarized wave of the antenna element 3 in an X-Y plane (in an azimuth plane) appears as one indicated by a solid line in FIG. 4, and a radiation pattern of the horizontally polarized wave thereof appears as one indicated by a broken line in FIG. 4. Also, a radiation pattern of the vertically polarized wave of the antenna element 3 in an X-Z plane (in an elevation plane) appears as one indicated by a solid line in FIG. 5, and a radiation pattern of the horizontally polarized wave thereof appears as one indicated by a broken line in FIG. 5.

As described above, the antenna apparatus 1 according to this embodiment has the antenna element 3 mounted on the circuit board 2 and having the structure of the inverse-F antenna, and the antenna apparatus 1 is arranged in the resin case 5 attached at the end portion of the air valve 22 such that the one side surface in the longitudinal direction of the space defined between the circuit board 2 and the radiating conductor 3a faces the sidewall 20c arranged near the external antenna 23. With this configuration, the vertically polarized wave with the high field intensity is radiated from the antenna element 3 toward the sidewall 20c. Thus, the gain of the vertically polarized wave component may be increased, and the entire antenna apparatus 1 may be reduced in height. In the antenna apparatus 1, since the electronic circuit portion 6 of the circuit board 2 is covered with the sheet-metal shield case 4 conducting to the grounding conductor layer 7, the electronic circuit portion 6 is electromagnetically shielded, whereby an erroneous operation may be prevented. In addition, the ground of the antenna element 3 may be enhanced by the shield case 4, resulting in the amount of radiation of the horizontally polarized wave being decreased while the amount of radiation of the vertically polarized wave being increased. Therefore, the antenna element 3 can efficiently radiate the vertically polarized wave toward the sidewall 20c arranged near the external antenna 23, thereby markedly improving the communication performance.

The antenna apparatus 1 may be attached to various types of wheels later without the necessity of modifying the air valve 22 to be attached. Accordingly, manufacturing cost of the antenna apparatus 1 may become relatively low, and usability of the antenna apparatus 1 may be improved. Also, since the antenna element 3 is formed by sheet-metal processing, the inexpensive antenna element 3 with a high mechanical strength may be manufactured. Thus, its parts cost may be reduced.

In addition, in the antenna apparatus 1, the other side surface of the space defined between the circuit board 2 and the radiating conductor 3a, the other side surface being disposed near the air valve 22 and extending in the longitudinal direction of the space, faces the wall surface 21b of the wheel rim 21 with the distance d interposed therebetween, the distance d being about one-fourth of the wavelength of the radio wave to be used. The radio wave radiated toward the sidewall 20*c* after it is reflected by the wall surface 21*b* may be easily superposed with the radio wave directly radiated from the antenna element 3 toward the sidewall 20*c* arranged near the external antenna 23. Accordingly, the gain of the vertically polarized wave component may be further increased.

In the antenna apparatus 1, the attachment protrusion 5*a* protrudes from the resin case 5, and the attachment protrusion 5*a* is inserted and pressed to the air hole 22*a* of the air valve 22 and fixed thereto. Accordingly, the resin case 5 may be attached to the end portion of the air valve 22 easily and reliably.

Figure 6:
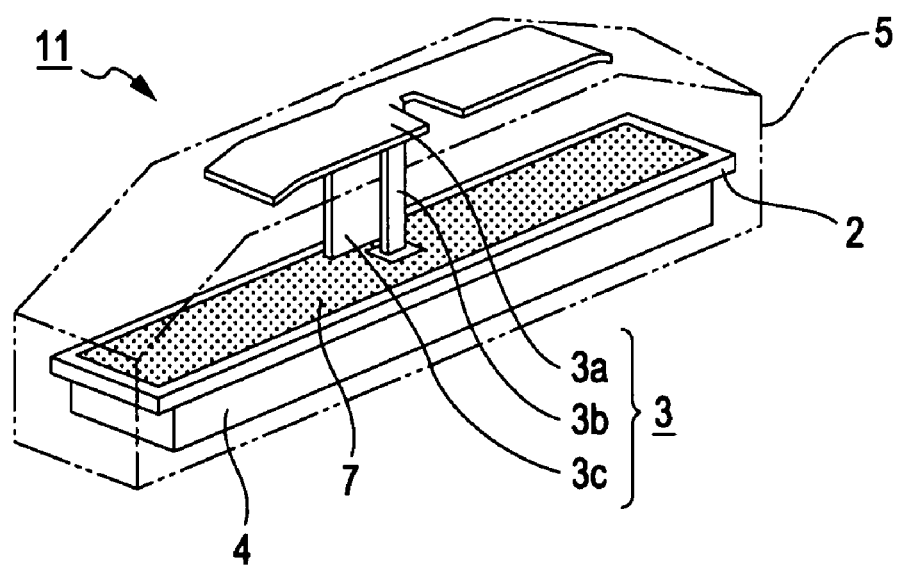
FIG. 6 is a perspective view showing an antenna apparatus according to a second embodiment of the present invention.

FIG. 6 is a perspective view showing an antenna apparatus according to a second embodiment of the present invention. The same reference numerals are given to the portions corresponding to FIGS. 2 and 3, and their descriptions are omitted.

An antenna apparatus 11 shown in FIG. 6 has an antenna element 3 formed by sheet-metal processing and having a shape markedly different from that of the above-described first embodiment. In particular, in the antenna element 3 of the antenna apparatus 11, the feeding conductor 3*b* and the grounding conductor 3*c* are formed as bent pieces extending toward the circuit board 2 from a center portion in a longitudinal direction of the radiating conductor 3*a* made of a metal plate. The antenna element 3 is an inverse-F antenna; however, the appearance thereof is substantially T-shaped. Since the antenna element 3 is substantially T-shaped, the amount of radiation of the horizontally polarized wave is decreased, and consequently, the radiation efficiency of the vertically polarized wave is further enhanced. In addition, the substantially T-shaped antenna element 3 may be mounted on the circuit board 2 in a markedly stable state.

What is claimed is:

1. An antenna apparatus comprising:
a circuit board having an electronic circuit portion provided on one surface thereof and a grounding conductor layer provided on the other surface thereof;
an antenna element mounted at the other surface of the circuit board;
a shield case formed by sheet-metal processing and conducting to the grounding conductor layer to cover the electronic circuit portion at the one surface of the circuit board; and
a resin case for accommodating the circuit board, the antenna element, and the shield case, the resin case being attached to an end portion of an air valve provided at a wheel rim of a tire of a vehicle,
wherein the antenna element includes a radiating conductor disposed substantially parallel to the grounding conductor layer, a feeding conductor extending from the radiating conductor toward the circuit board and connected to the electronic circuit portion, and a grounding conductor extending from the radiating conductor toward the circuit board and connected to the grounding conductor layer, and a posture of the antenna element in the resin case is determined such that one side surface extending in a longitudinal direction of a space defined between the circuit board and the radiating conductor faces one of sidewalls of the tire.

2. The antenna apparatus according to claim 1, wherein the other side surface extending in the longitudinal direction of the space defined between the circuit board and the radiating conductor faces a wall surface of the wheel rim with a distance interposed therebetween, the distance being about one-fourth of a wavelength of a radio wave to be used.

3. The antenna apparatus according to claim 1, wherein the antenna element is formed by sheet-metal processing, and the feeding conductor and the grounding conductor are formed as bent pieces extending toward the circuit board from an end portion in a longitudinal direction of the radiating conductor made of a metal plate.

4. The antenna apparatus according to claim 1, wherein the antenna element is formed by sheet-metal processing, and the feeding conductor and the grounding conductor are formed as bent pieces extending toward the circuit board from a center portion in a longitudinal direction of the radiating conductor made of a metal plate.

5. The antenna apparatus according to claim 1, wherein the resin case has an attachment protrusion to be inserted and pressed to an air hole of the air valve and fixed thereto.

* * * * *